(12) United States Patent
Dallan

(10) Patent No.: US 11,912,521 B2
(45) Date of Patent: Feb. 27, 2024

(54) CONVEYOR BELT

(71) Applicant: DALLAN S.P.A., Castelfranco Veneto (IT)

(72) Inventor: Andrea Dallan, Castelfranco Veneto (IT)

(73) Assignee: DALLAN S.P.A., Castelfranco Veneto (IT)

( * ) Notice: Subject to any disclaimer, the term of this patent is extended or adjusted under 35 U.S.C. 154(b) by 0 days.

(21) Appl. No.: 17/557,462

(22) Filed: Dec. 21, 2021

(65) Prior Publication Data

US 2022/0194729 A1 Jun. 23, 2022

(30) Foreign Application Priority Data

Dec. 23, 2020 (IT) .......................... 102020000032165

(51) Int. Cl.
| | | |
|---|---|---|
| *B65H 29/36* | (2006.01) | |
| *B65G 21/14* | (2006.01) | |
| *B65H 29/38* | (2006.01) | |

(52) U.S. Cl.
CPC ............ *B65H 29/36* (2013.01); *B65G 21/14* (2013.01); *B65H 29/38* (2013.01); *B65H 2404/1544* (2013.01); *B65H 2404/254* (2013.01)

(58) Field of Classification Search
CPC .................... B65H 29/36; B65H 29/38; B65H 2404/1544; B65H 2404/254; B65G 21/14
See application file for complete search history.

(56) References Cited

U.S. PATENT DOCUMENTS

| | | | |
|---|---|---|---|
| 1,041,439 A | 10/1912 | Dearborn | |
| 5,555,968 A | 9/1996 | Seefeldt et al. | |
| 2008/0060916 A1* | 3/2008 | Whittlesey | B65G 21/06 |
| | | | 198/812 |

(Continued)

FOREIGN PATENT DOCUMENTS

| | | | | |
|---|---|---|---|---|
| CH | 716151 A1 * | 11/2020 | ............. | B65G 21/02 |
| CH | 716151 A1 | 11/2020 | | |
| CN | 109484803 A | 3/2019 | | |

(Continued)

OTHER PUBLICATIONS

Italian Search Report for Italian Patent Application No. 102020000032165, dated Aug. 24, 2021, 2 Pages.

*Primary Examiner* — Gene O Crawford
*Assistant Examiner* — Abby A Jorgensen
(74) *Attorney, Agent, or Firm* — Armstrong Teasdale LLP

(57) ABSTRACT

A conveyor belt includes: —a support structure; —a mobile belt; —a plurality of rollers, which are associated to the support structure and are suitable to support and move the belt along a closed path. The plurality of rollers includes a drive roller and at least three idler rollers. Two rollers are supported directly by the support structure, while two rollers are supported by a mobile frame, which is slidingly associated to the support structure to be moved between a retracted position, in which a roller arranged at the second end is positioned completely inside the support structure, and an extracted position, in which the roller protrudes outside the support structure. In the transition between the two positions, the length of the useful conveyor area of the belt varies and is compensated by an equivalent variation in length of another portion of the closed path.

16 Claims, 11 Drawing Sheets

(56) References Cited

U.S. PATENT DOCUMENTS

2011/0070059 A1\* 3/2011 Savoia ................. B65G 47/252
                                                      414/758
2014/0234067 A1   8/2014 Knoefel et al.

FOREIGN PATENT DOCUMENTS

| CN | 210476169 U | \* | 5/2020 | | |
|----|----|----|----|----|----|
| DE | 1556022 A1 | | 1/1970 | | |
| EP | 0638502 A2 | | 2/1995 | | |
| IT | BO20090484 A1 | | 1/2011 | | |
| WO | 2012088226 A1 | | 6/2012 | | |
| WO | WO-2020225281 A1 | \* | 11/2020 | ............. | B65G 21/02 |

\* cited by examiner

CONVEYOR BELT

CROSS-REFERENCE TO RELATED APPLICATIONS

This application claims priority to Italian Application No. 102020000032165, filed Dec. 23, 2020, which is hereby incorporated by reference in its entirety.

FIELD OF APPLICATION

The present invention relates to a conveyor belt.

In particular, the conveyor belt according to the invention is intended to be inserted inside a plant or processing line of material in laminar form (such as plates or sheets) or of profiles to allow the transfer of small processed pieces between two sections of said plant or processing line.

In particular, the conveyor belt according to the invention may be arranged downstream of a laser cutting plant for pieces from laminar materials and upstream of an unloading bench for the processed pieces.

The processed pieces may originate from the processing of any material, in particular from laminar material wound in reels or in the form of single sheets, or from bars, squares, etc.

PRIOR ART

As is known, a conveyor belt is a device used to transport objects, materials, finished or semi-finished products, intended to be processed on an industrial scale.

Generally, a conveyor belt comprises a conveyor belt or mat, a drive roller and an idler roller. The drive roller and the idler roller are associated in fixed positions to a support structure. The belt forms a closed loop partially wound at two opposite ends on the drive roller and on the idler roller. The rotation of the drive roller is transferred to the belt section arranged between the two rollers as a translation motion. In this way, the belt may translate the pieces resting on it by moving them in the section between the drive roller and the idler roller. The belt section (generally horizontal and forming the upper portion of the closed loop) which is progressively located between the drive roller and the idler roller defines the useful transport plane of the conveyor belt. The distance between these two rollers defines the useful transport distance of the conveyor belt.

In particular, conveyor belts are used to connect two different sections of an industrial processing line together. In this case, the conveyor belt receives the products/materials at the outlet from the upstream section and feeds these products/materials at the input to the downstream section.

In the event that the pieces or materials to be handled are small, to avoid accidental falls of the pieces at the entrance and/or exit of the conveyor belt it is necessary that between the ends of the conveyor belt and the sections of the processing line to be connected to it there are no empty spaces larger than the dimensions of the pieces to be transported. In other words, it is necessary to create adequate continuity of support for the pieces between the conveyor belt and the two sections of the processing line.

Generally, to meet this operational requirement, the conveyor belt is positioned in such a way that at its ends the belt goes as close as possible to the devices for moving the pieces of the two sections of the processing line. In some cases, however, the conveyor belt cannot always be kept in this proximity position. In fact, it may happen that in some operating steps, when placed in a position of proximity, the conveyor belt interferes with the operation of the equipment of at least one of the two sections of the processing line. It is therefore necessary to make the conveyor belt movable in such a way that it may be moved between an interference position, in which the continuity of piece transfer is guaranteed, and a non-interference position, in which the continuity of piece transfer is not guaranteed.

In such cases, the conveyor belt is provided with a movable support structure. This complicates not only the construction of the conveyor belt (which must be provided with a mobile support structure), but also its operational management. During the operation of the processing line in which the conveyor belt is inserted, it is in fact necessary to regularly check the correct positioning of the entire conveyor belt with respect to the two sections of the processing line.

In the technical sector of reference there is therefore the need to have a conveyor belt which allows its own positioning in space to be varied in a manner that is operationally easier to be controlled than traditional solutions.

DISCLOSURE OF THE INVENTION

Therefore, the main object of the present invention is to eliminate in whole or in part the drawbacks of the aforementioned prior art, by providing a conveyor belt which allows its positioning in space to be varied in a manner that is operationally easier to be controlled.

A further object of the present invention is to provide a conveyor belt which is simple and cost-effective to manufacture.

BRIEF DESCRIPTION OF THE DRAWINGS

The technical features of the invention, according to the aforesaid objects, may clearly be seen in the content of the claims below, and its advantages will become more readily apparent in the detailed description that follows, made with reference to the accompanying drawings, which illustrate one or more purely exemplary and non-limiting embodiments thereof, in which:

DETAILED DESCRIPTION

Figure 1:
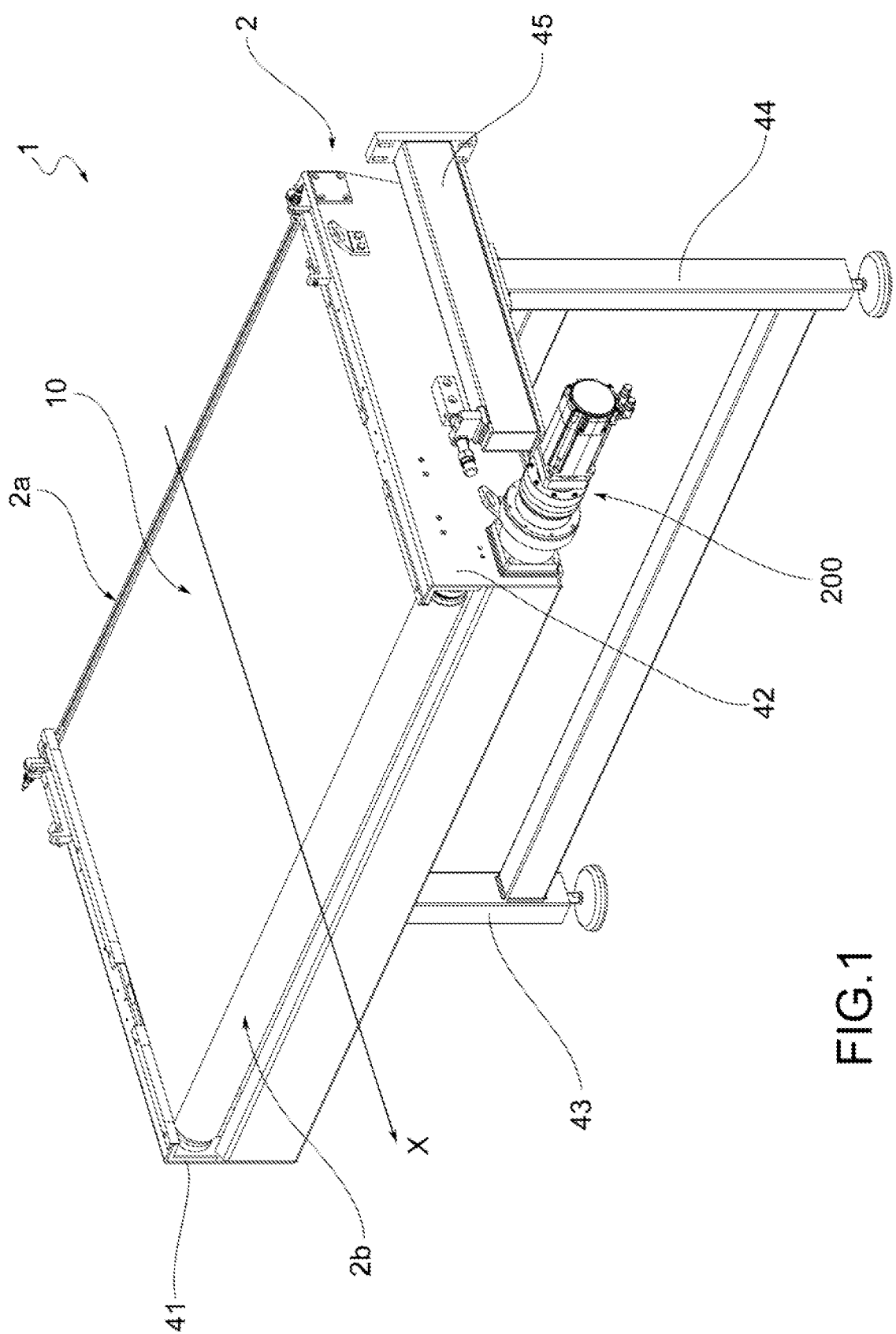
FIG. 1 shows a perspective view of a conveyor belt 1 according to a preferred embodiment of the present invention, illustrated with a mobile frame arranged in the retracted position.

The conveyor belt according to the invention has been indicated as a whole with reference numeral 1 in the accompanying figures.

Herein and in the following description and the claims, reference will be made to the conveyor belt 1 in use condition. Therefore, any references to a lower or upper position or to a horizontal or vertical orientation should be interpreted in such condition.

The conveyor belt 1 is intended to be inserted inside a processing line of material in laminar form (such as plates or sheets) or of profiles to allow the transfer of small processed pieces between two sections of said processing line.

Figure 2:
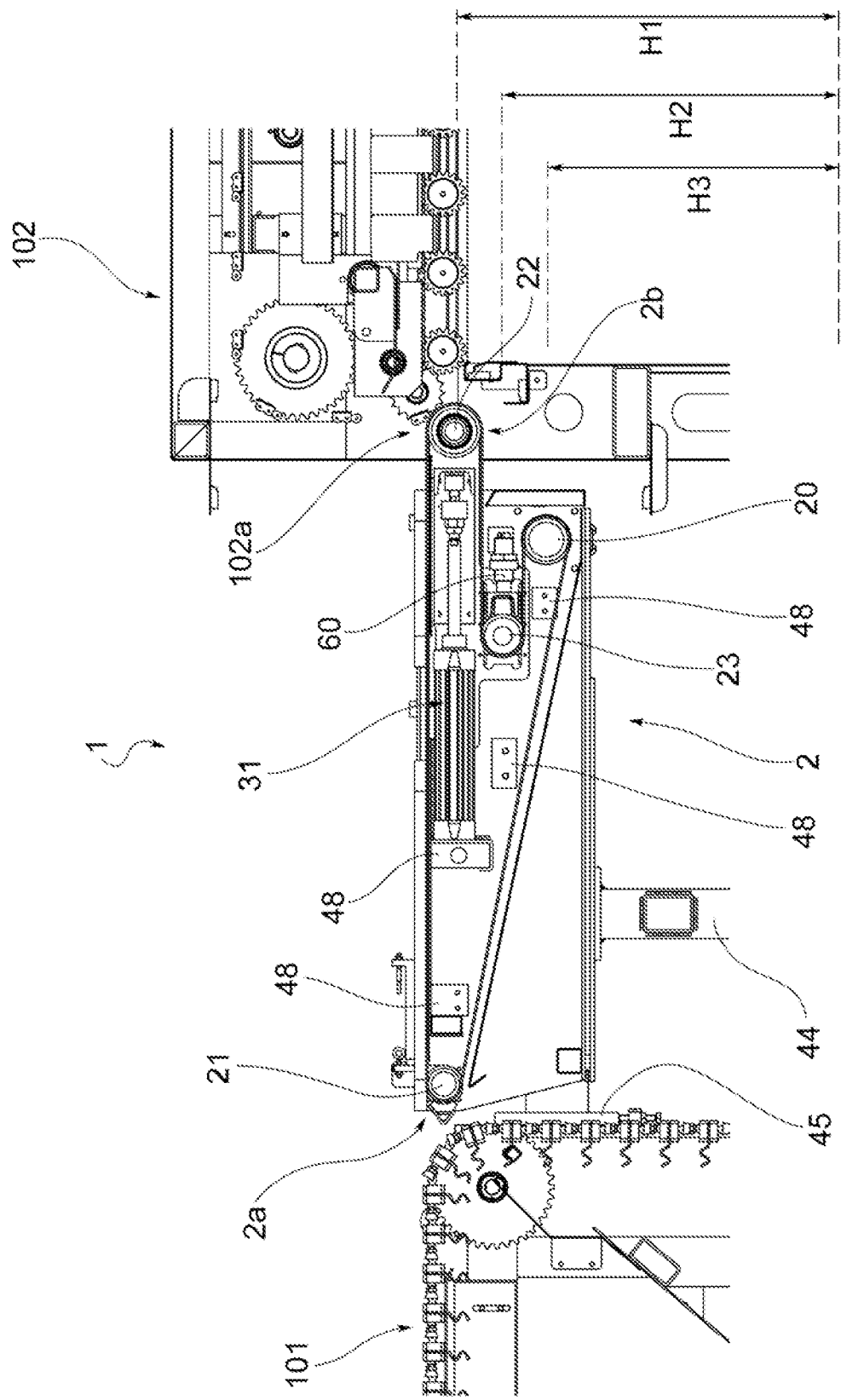
FIG. 2 shows a sectional view of the conveyor belt of FIG. 1, illustrated with a mobile frame arranged in the extracted position and integrated in a processing line comprising a first and a second processing plant.
Figure 3:
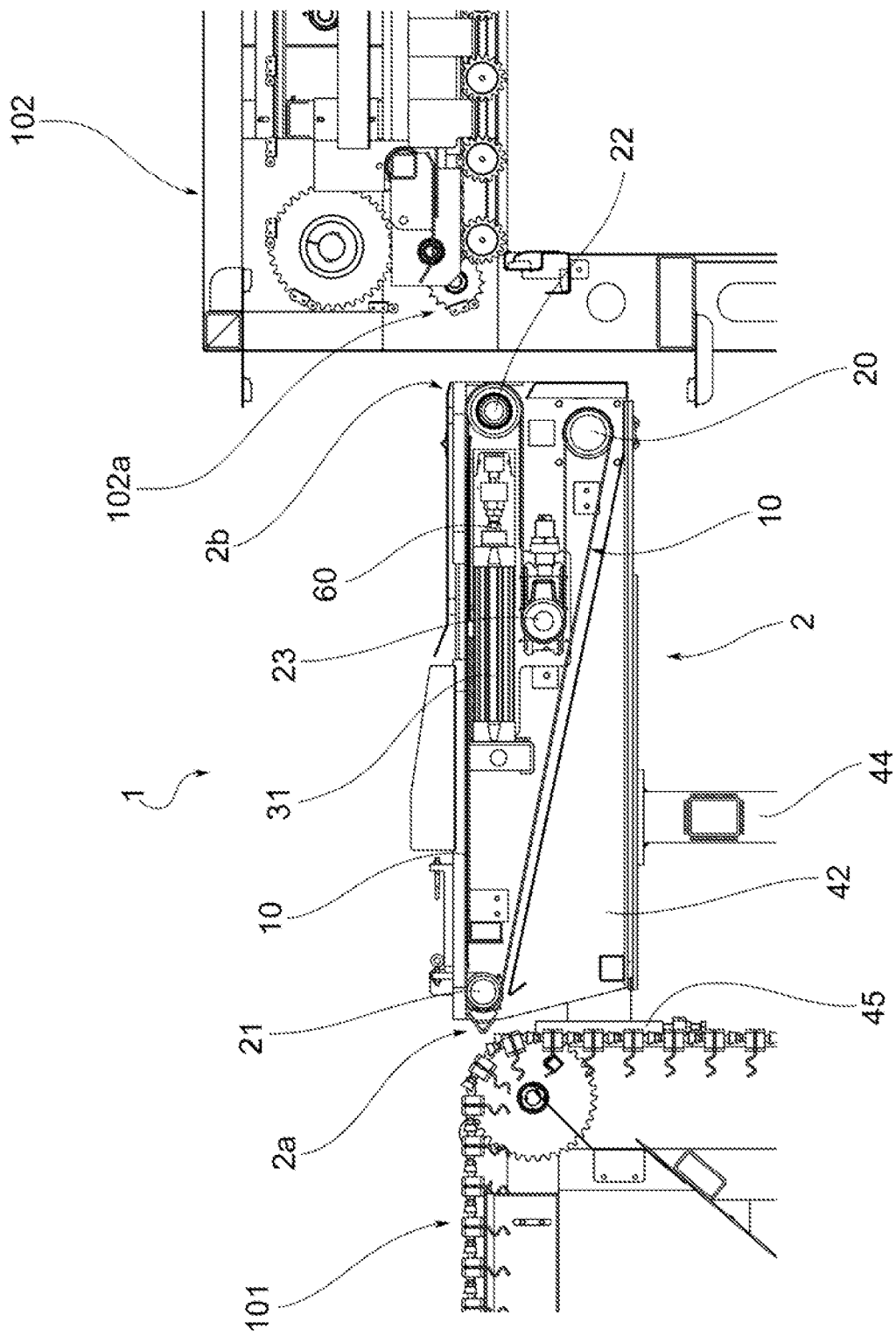
FIG. 3 shows the conveyor belt of FIG. 2, illustrated with a mobile frame arranged in the retracted position.

In particular, as schematically shown in FIGS. 2 and 3, the conveyor belt according to the invention may be arranged downstream of a laser cutting plant 101 for pieces from laminar materials and upstream of an unloading bench 102 for the processed pieces.

In particular, the unloading bench 102 may consist of a roller unloading bench as described in the Italian patent application n. 102019000006164 in the name of the same applicant.

According to a general embodiment of the invention, the apparatus 1 comprises:
 a support structure 2;
 a mobile belt 10 which is supported by the support structure 2 and extends between a first end 2a and a second end 2b along a direction of movement X to form a transport plane m;
 a plurality of rollers which are associated to the support structure 2 and are suitable to support and move the mobile belt 10 along a closed path.

The aforementioned plurality of rollers comprises a drive roller 20 for driving the mobile belt and at least one idler roller 21.

Advantageously, as illustrated in FIG. 1, the support structure 2 may be provided with one or more pedestals 43, 44. The support structure 2 may be independent or it may be configured to be fixed to the structure of a plant of the processing line in which the conveyor belt 1 is inserted. In the accompanying figures, and in particular in FIGS. 2 and 3, the second configuration is illustrated; in particular, the support structure 2 is shown in a configuration provided with anchoring brackets 45 to a plant 101 of the processing line.

The aforementioned plurality of rollers comprises two further idler rollers 22, 23 in addition to the drive roller 20 and to the at least one idler roller 21.

All the rollers 20, 21, 22 and 23 of the plurality of rollers have rotation axes parallel to each other and orthogonal to the direction of movement X.

More in detail, as shown in particular in FIGS. 2 to 5, two first rollers 21 and 22 of said plurality of rollers are arranged at the same height H1: a roller 21 is arranged at the aforementioned first end 2a and a roller 22 is arranged at the second end 2b. In this way, said two first rollers 21 and 22 impose a horizontal section P1 in the closed path on the mobile belt 10. This horizontal section P1 defines the aforementioned transport plane m.

As shown in particular in FIGS. 2 to 5, two second rollers 20, 23 of said plurality of rollers are arranged in proximity of the second end 2b, below the first two rollers 21, 22.

More in detail, these two second rollers 20, 23 are offset from each other both horizontally and in height, the roller 23 at an intermediate height H2 and the roller 20 at a lower height H3, respectively, so as to impose on the mobile belt 10—in cooperation with the roller 22 arranged at the second end 2b—a double S-shaped section P2 in the closed path.

The closed path of the mobile belt 10 is completed by an inclined section P3 connecting the double S-shaped section P2 to the horizontal section P1 at the roller 21 arranged at the first end 2a.

According to an essential aspect of the present invention, the roller 21 arranged at the first end 2a and the roller 20 arranged at said lower height H3 are rotationally supported directly by the support structure 2 in fixed positions.

The roller 22 arranged at the second end 2b and the roller 23 arranged at said intermediate height H2 are instead rotationally supported by a mobile frame 30.

Figure 4:
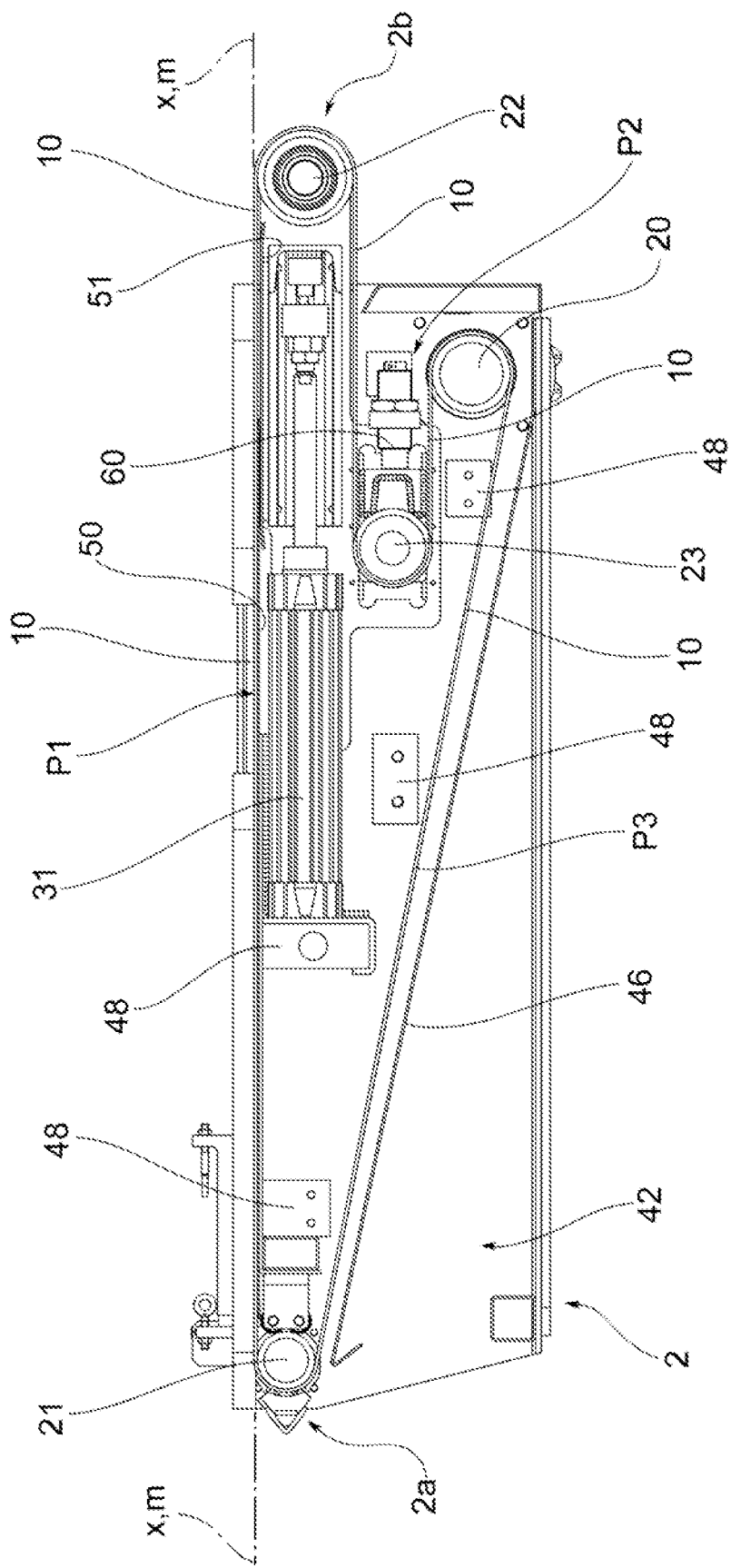
FIGS. 4 and 5 show the conveyor belt of FIGS. 2 and 3, respectively, illustrated separately from the plants of the processing line.
Figure 5:
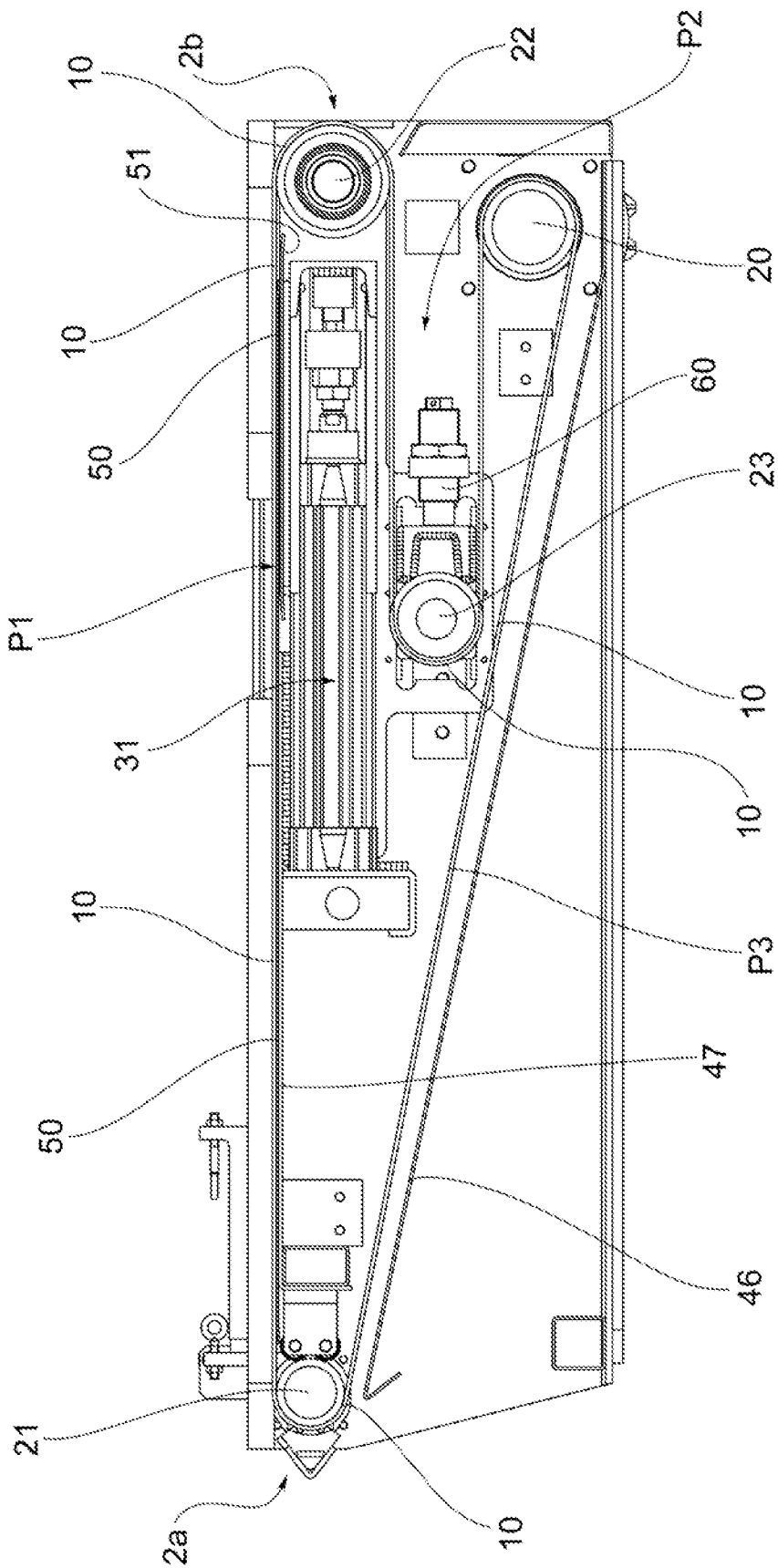

Operationally, the mobile frame 30 is slidingly associated to the support structure 2 to be moved between:
 a retracted position, in which the roller 22 arranged at the second end 2b is positioned completely inside said support structure 2 (as illustrated in FIGS. 3 and 5), and
 an extracted position, in which the roller 22 arranged at the second end 2b protrudes outside said support structure 2 (as illustrated in FIGS. 2 and 4).

Operationally, as may be seen by comparing FIGS. 2 and 4 with FIGS. 3 and 5, in the transition between the aforementioned retracted position and the aforementioned extracted position, the length of the horizontal section P1 of the closed path varies and is compensated by an equivalent variation in length of the double S-shaped section P2. The variation in length of the double S-shaped section P2 which compensates for the variation of the horizontal section P1 without causing any variation in the length of the closed path (and therefore tensions on the belt) is due to the fact that the roller 23 arranged at said intermediate height H2 (associated to the mobile frame 30) integrally follows the movements of the roller 22 arranged at the second end 2b.

More in detail, in the transition from the aforementioned retracted position (FIGS. 3 and 5) to the aforementioned extracted position (FIGS. 2 and 4), the length of the horizontal section P1 of the closed path increases and is compensated by an equivalent reduction in the length of the double S-shaped section P2. On the contrary, in the reverse passage from the aforementioned extracted position (FIGS. 2 and 4) to the aforementioned retracted position (FIGS. 3 and 5), the length of the horizontal section P1 of the closed path decreases and is compensated by an equivalent increase in length of the double S-shaped section P2.

The conveyor belt 1 according to the invention therefore configures a conveyor belt with transport plane m of variable length. This allows the conveyor belt 1 to vary its positioning in space in an operationally simpler way to be controlled than traditional conveyor belts which, by defining a transport plane m of fixed length, must instead be moved in their entirety to change their positioning in space.

From an operational point of view, this makes the conveyor belt 1 according to the invention particularly suitable for interfacing with systems which require, during their operation, the transition from an active configuration, in which the conveyor belt must engage an input of such plant, to a passive configuration, in which the conveyor belt does not have to engage such input.

According to a preferred embodiment illustrated in the accompanying figures, the aforementioned mobile frame 30 is movable parallel to the transport plane m in such a way that the rotation axes of the rollers 22, 23 supported thereon are always kept parallel to the transport plane m and positioned at the respective heights H2, H3.

Advantageously, the aforementioned mobile frame 30 is slidingly associated to the support structure 2 at two sides 41, 42 of said support structure 2 placed in opposite lateral positions parallel to the direction of movement (X).

Figure 11:
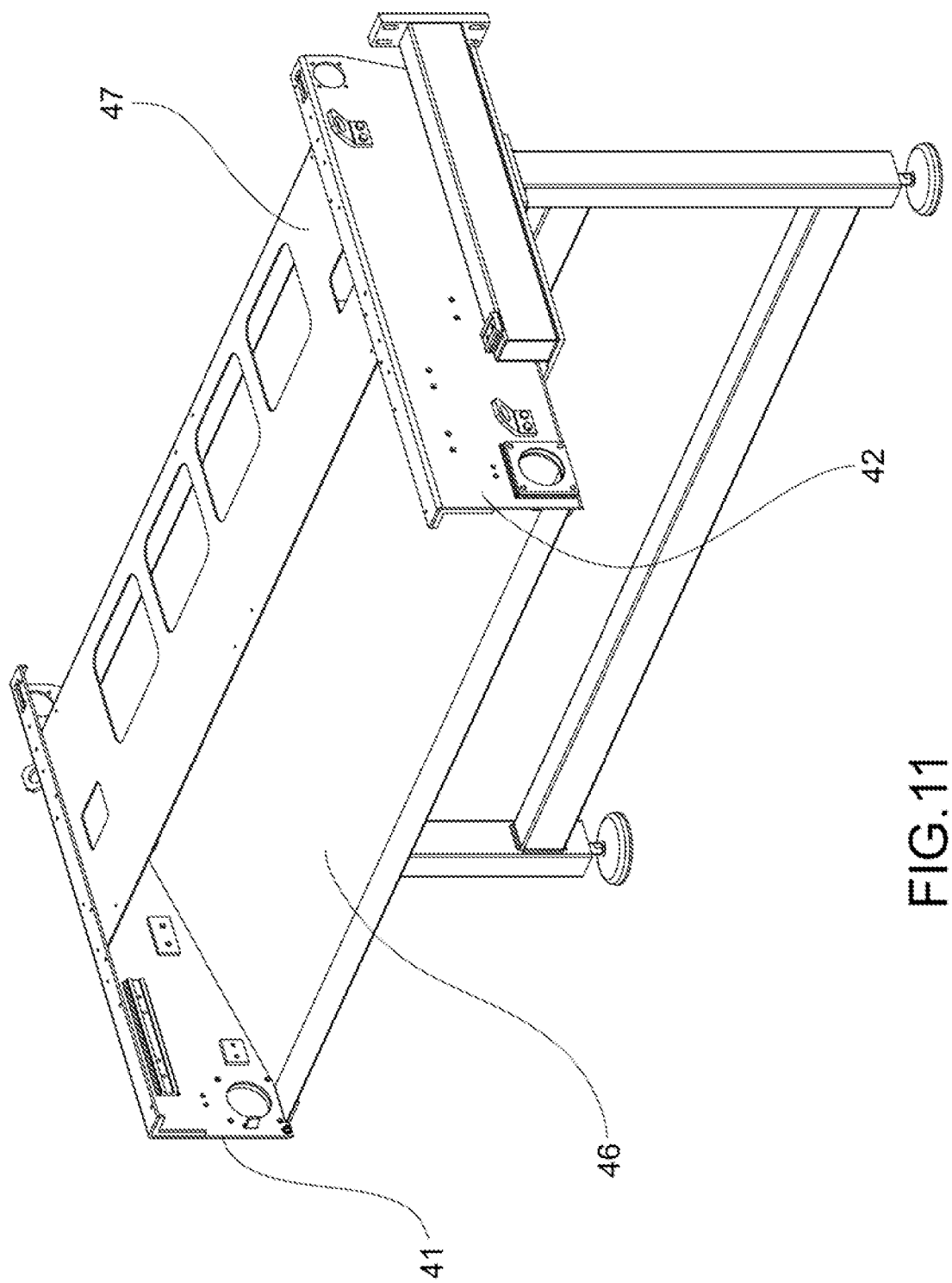
FIG. 11 shows a perspective view of only the support structure of the conveyor belt of FIG. 1, with some parts removed to better highlight others.

Preferably, as shown in particular in FIG. 11, the support structure 2 may consist of a partially open box-like structure, comprising the aforementioned two sides 41, 42 which are connected by a bottom wall 46 (which preferably follows the inclination of the inclined section P3 of the closed path) and by a top wall 47 (which is preferably parallel to the transport plane m). Advantageously, the support structure 2 may also comprise one or more reinforcing longitudinal members 48 which connect the two sides 41, 42 to each other and may act as supports for the sliding movement of the mobile frame 30. In particular, the box-like structure is open to allow the mobile frame 30 to transition between the extracted position and the retracted position.

Preferably, the aforesaid mobile frame 30 is movable between the retracted position and the extracted position by actuator means 31 acting between the support structure 2 and the mobile frame 30.

According to the embodiment illustrated in the accompanying figures, the aforementioned actuator means 31 consist of at least one pneumatic cylinder, preferably a pair of pneumatic cylinders placed in opposite positions parallel to said direction of movement X.

According to the embodiment illustrated in the accompanying figures, the roller 20 placed at said lower height H3 constitutes the drive roller, and the remaining rollers 21, 22, 23 constitute the idler rollers. In the accompanying figures, the motor means of the drive roller 20 are indicated with reference numeral 200. This configuration is preferred since the motor means 200 are in the position of least operational obstacle.

According to an embodiment not illustrated in the accompanying figures, the roller 21 placed at the first end 2a constitutes the drive roller, and the remaining rollers 20, 22, 23 constitute the idler rollers.

In general, it is preferable that the drive roller consists of one of the two rollers 20 and 21 directly associated to the support structure 2 in fixed positions.

However, embodiments may be envisaged in which the drive roller consists of one of the two rollers 22 and 23 associated to the mobile frame 30. This configuration is not preferred because it requires the positioning of the motor means in narrower spaces.

Preferably, the conveyor belt 1 comprises support means 50, 51 underneath the mobile belt 10 and suitable for supporting the mobile belt 10 underneath the horizontal section P1 of the closed path, as shown, for example, in FIGS. 4 and 5.

Figure 6:
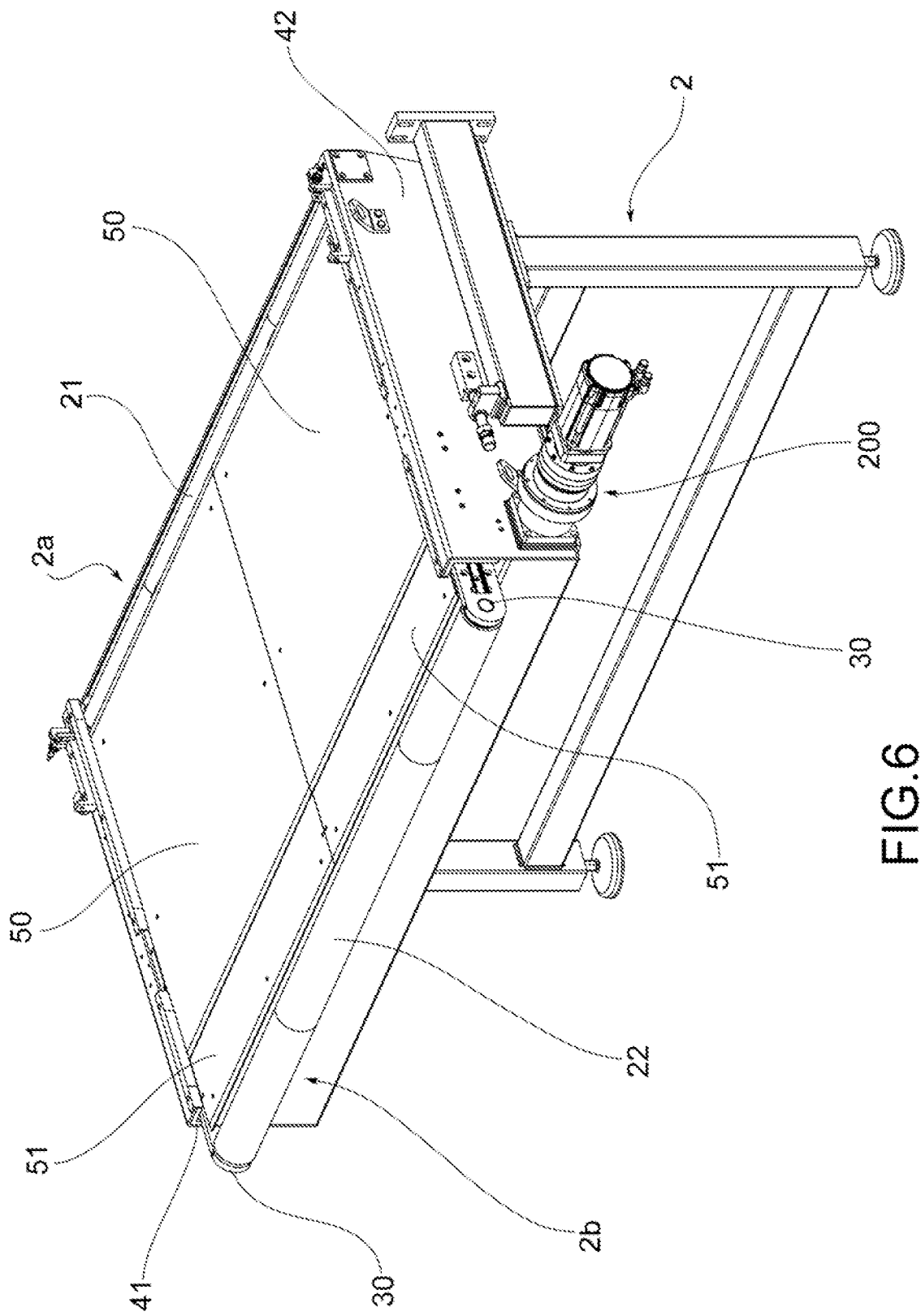
FIG. 6 shows the conveyor belt of FIG. 1 without the mobile belt to make some underlying parts visible.
Figure 7:
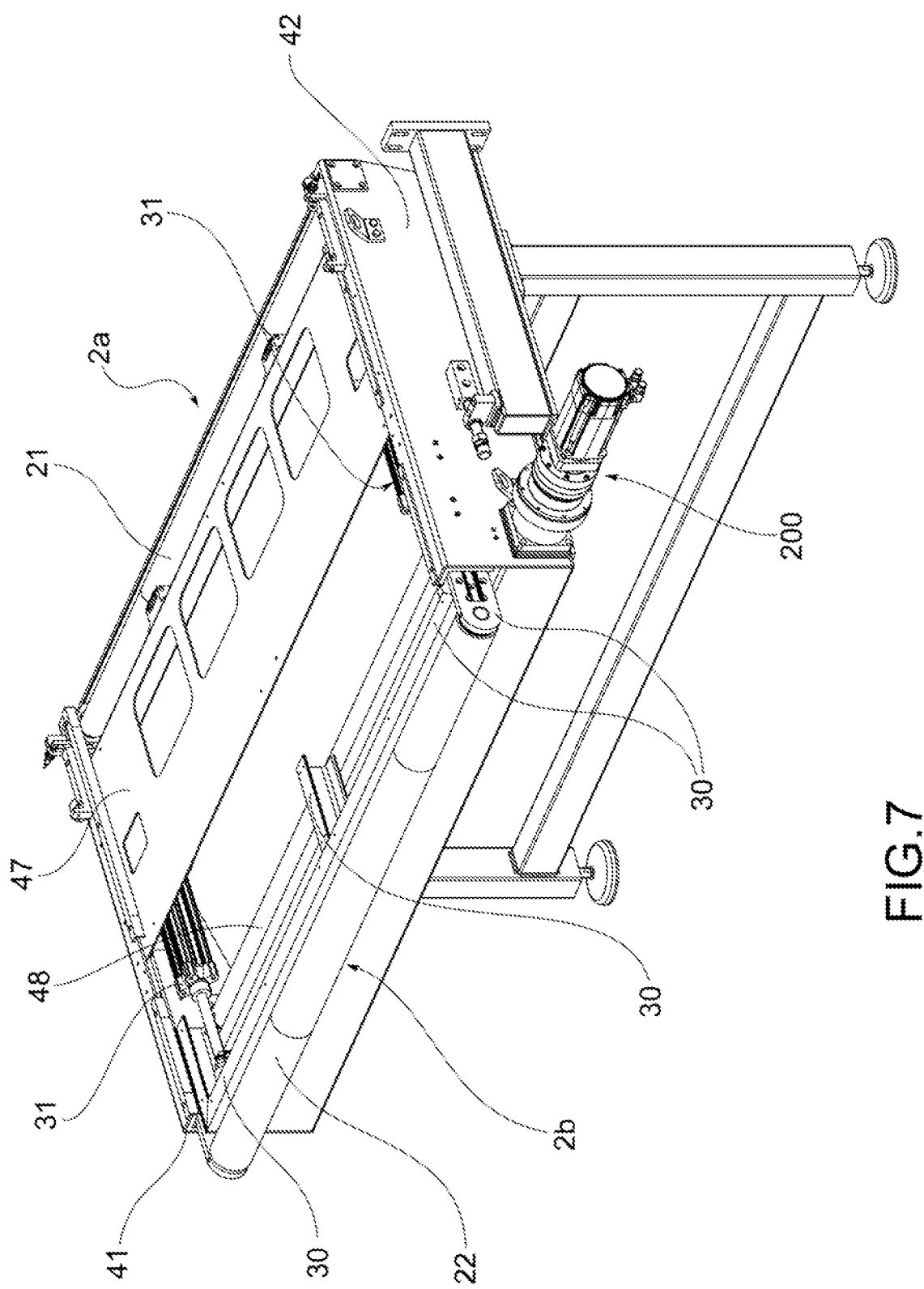
FIG. 7 shows the conveyor belt of FIG. 6 also without the support means of the mobile belt to make some underlying parts visible.
Figure 8:
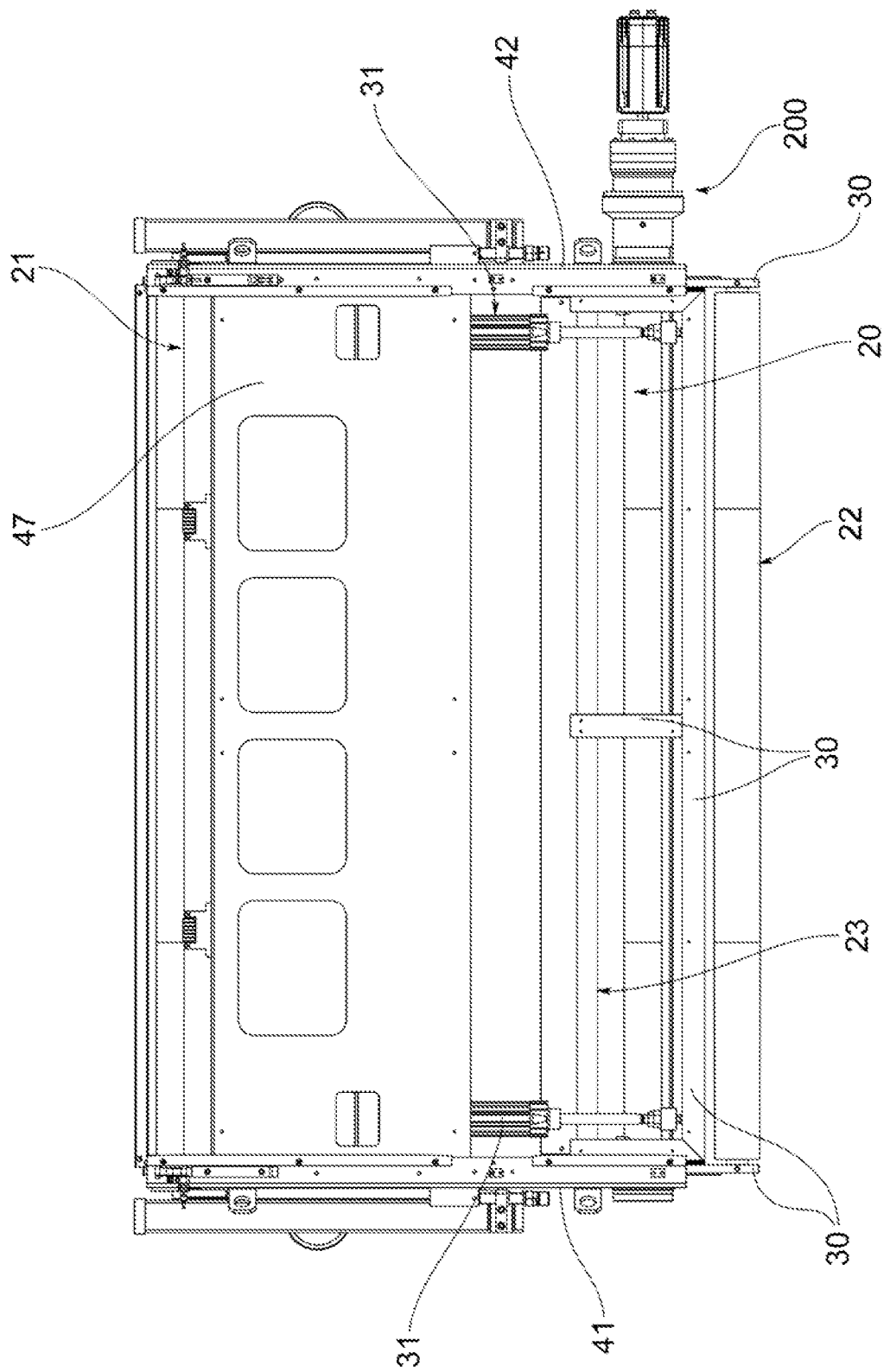
FIG. 8 shows an orthogonal view of the conveyor belt of FIG. 7.
Figure 9:
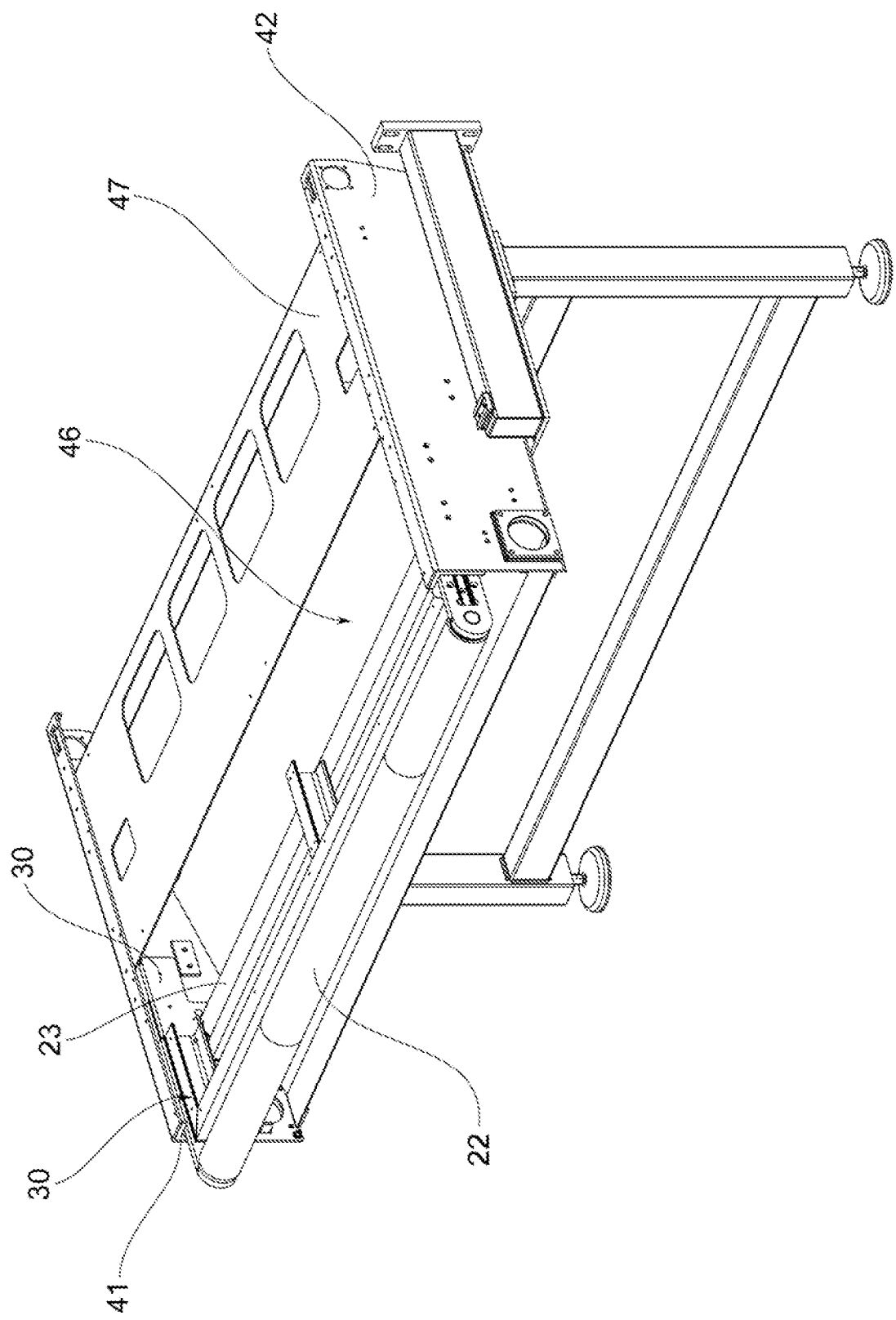
FIG. 9 shows the conveyor belt of FIG. 6 with some parts removed to better highlight others.
Figure 10:
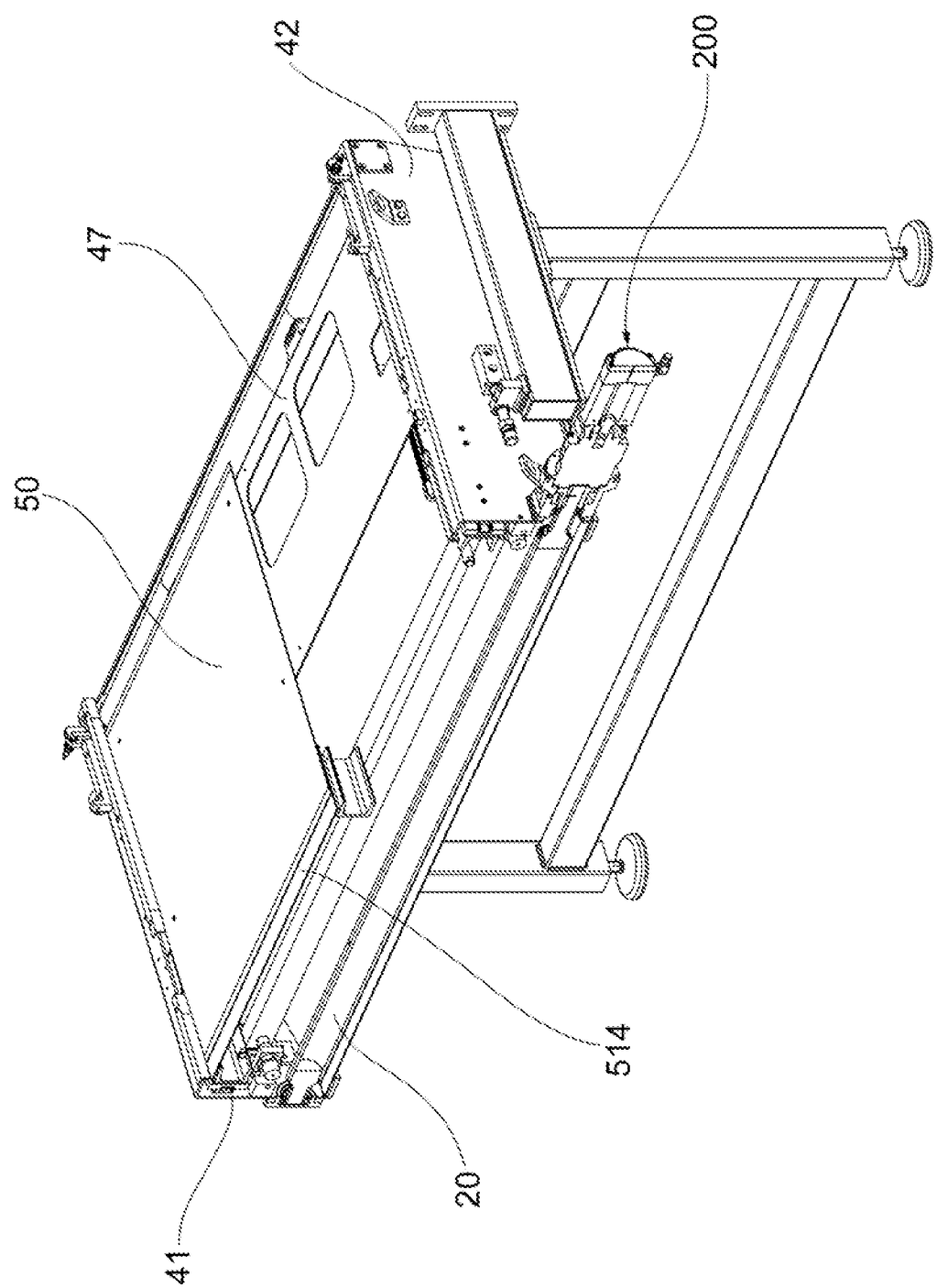
FIG. 10 shows the conveyor belt of FIG. 6 partially sectioned and with some parts removed to better highlight others.

According to the preferred embodiment illustrated in the accompanying figures, and in particular in FIGS. 6 and 10, the aforementioned support means 50, 51 comprise at least one fixed plate 50 associated directly to the support structure 2 and at least one mobile plate 51 integral with the mobile frame 30.

More specifically, the fixed plate 50 and the mobile plate 51 are arranged on staggered planes parallel to the transport plane m defined by the mobile belt 10 at the horizontal section P1. Preferably, the mobile plate 51 is arranged below the fixed plate 50.

Advantageously, the fixed plate 50 and the mobile plate 51 are dimensioned in such a way that they are always at least partially overlapping so as to always ensure continuity of support for the mobile belt 10 in whatever position the mobile frame 30 is located with respect to the support structure 2.

Advantageously, the conveyor belt 1 comprises adjustment means 60 for adjusting the position of the roller 23 placed at the intermediate height H2 along the movement axis X with respect to the mobile frame 30. Operationally, these adjustment means 60 configure a tensioning system for the mobile belt 10, useful for the correct assembly of the belt 10 during the assembly or maintenance step of the conveyor belt 1.

The present invention relates to a processing line for laminar material, in particular metal sheets.

More in detail, as illustrated in FIGS. 2 and 3, the laminar material processing line according to the invention comprises:

a first processing plant 101;
a second processing plant 102, which is placed downstream of said first plant 101 and is suitable to process workpieces in output from said first plant 101; and
a conveyor belt that is placed between said first plant 101 and said second plant 102 for transferring workpieces in output from the first plant 101 to an input 102a of the second plant 102.

The second plant 102 is configured to require that in predefined operational steps of processing, the aforesaid input 102a is disengaged from the conveyor belt.

The aforesaid conveyor belt consists of a conveyor belt 1 according to the invention, and in particular as described above.

The conveyor belt 1 is arranged in a fixed position between the first plant 101 and the second plant 102 and is oriented in such a way that:

the mobile belt 10 has its second end 2b arranged at the input 102a of the second plant 102 when the mobile frame 30 is in the aforementioned extracted position; and
the mobile belt 10 may disengage the aforementioned input 102a when the mobile frame 30 is in the retracted position.

Preferably, the laminar material processing line comprises a control unit (not illustrated in the accompanying figures) programmed to control the movements of the mobile frame 30 (and therefore of the roller 22 arranged at the second end 2b) by means of the aforementioned actuator means 31 according to the operational steps of the second plant 102.

Preferably, the aforementioned first plant 101 is a laser cutting plant for parts from laminar materials. FIGS. 2 and 3 of this laser cutting plant show only a portion of the handling system in the output area. In particular, the handling system is of the spike bed type.

Preferably, the aforementioned second plant 102 is a bench for unloading the parts processed by the first plant 101. In particular, the unloading bench 102 may consist of a roller unloading bench as described in the Italian patent application n. 102019000006164 in the name of the same applicant, which is incorporated herein entirely by reference.

The invention allows obtaining numerous advantages, already described in part.

The conveyor belt 1 according to the invention configures a conveyor belt with transport plane m of variable length. This allows the conveyor belt 1 to vary its positioning in space in an operationally simpler way to be controlled than traditional conveyor belts which, by defining a transport plane m of fixed length, must instead be moved in their entirety to change their positioning in space.

From an operational point of view, this makes the conveyor belt 1 according to the invention particularly suitable for interfacing with systems which require, during their operation, the transition from an active configuration, in which the conveyor belt must engage an input of such plant, to a passive configuration, in which the conveyor belt does not have to engage such input.

The conveyor belt 1 according to the invention is simple and cost-effective to manufacture, as may be seen from the description made of one or more particular embodiments.

The conveyor belt 1 according to the invention is also operationally simple and easy to control, as previously described.

The invention thus conceived therefore achieves its intended purposes.

Of course, in its practical implementation it may also assume different forms and configurations from the one illustrated above, without thereby departing from the present scope of protection.

Furthermore, all details may be replaced with technically equivalent elements, and dimensions, shapes and materials used may be any according to the needs.

What is claimed is:

1. A conveyor belt comprising:
   a support structure;
   a mobile belt which is supported by said support structure and extends between a first end and a second end along a movement direction to form a transport plane;
   a plurality of rollers that are associated to said support structure and are suitable to support and move said mobile belt along a closed path, said plurality of rollers comprising a drive roller and at least one idler roller, wherein said plurality of rollers comprises two further idler rollers, wherein:
      two first rollers of said plurality of rollers are placed at a same height (H1), wherein one first roller is placed at said first end and the other first roller is placed at said second end so as to impose on the mobile belt a horizontal section (P1) in said closed path, the horizontal section (P1) defining said transport plane; and
      two second rollers of said plurality of rollers are placed in proximity of said second end lower than the two first rollers, said two second rollers being staggered both horizontally and in height respectively at an intermediate height (H2) and at a lower height (H3), so as to impose on the mobile belt—in cooperation with the other first roller arranged at the second end—a double S-shaped section (P2) in the closed path, said closed path being completed by an inclined section (P3) connecting the double S-shaped section (P2) to the horizontal section (P1) at the one first roller placed at the first end,
   wherein the one first roller placed at the first end and the one of the two second rollers placed at said lower height (H3) are rotationally supported directly by said support structure in fixed positions, while the other first roller placed at the second end and the one of the two second rollers placed at said intermediate height (H2) are rotationally supported by a mobile frame which is slidingly associated to said support structure to be moved between a retracted position, in which the other first roller placed at said second end is positioned completely inside said support structure, and an extracted position, in which the other first roller placed at said second end protrudes outside said support structure,
   wherein, while transitioning between said retracted position and said extracted position, a length of said horizontal section (P1) varies and is compensated by an equivalent variation in length of the double S-shaped section (P2), due to the fact that the one of the two second rollers placed at said intermediate height (H2) integrally follows movements of the other first roller placed at the second end; and
   support means suitable for supporting said mobile belt underneath the horizontal section (P1) of said closed path, said support means comprising at least one fixed plate directly associated to said support structure and at least one mobile plate integral with said mobile frame, wherein said at least one fixed plate and said at least one mobile plate are placed on staggered planes underneath and parallel to the transport plane defined by the mobile belt at the horizontal section (P1).

2. The conveyor belt according to claim 1, wherein said mobile frame is movable parallel to said transport plane in such a way that a rotation axis of the one of the second rollers placed at the intermediate height (H2) and a rotation axis of the one of second rollers placed at the lower height (H3) are always kept parallel to the transport plane and positioned at the respective heights (H2, H3).

3. The conveyor belt according to claim 1, wherein said mobile frame is slidingly associated to said support structure at two sides of said support structure placed in opposite lateral positions parallel to the movement direction of the transport plane.

4. The conveyor belt according to claim 1, wherein said mobile frame is movable between the retracted position and the extracted position by actuator means acting between said support structure and said mobile frame.

5. The conveyor belt according to claim 4, wherein said actuator means comprise at least one pneumatic cylinder.

6. The conveyor belt according to claim 1, wherein the one of the second rollers placed at said lower height (H3) constitutes the drive roller, and the remaining rollers constitute the idler roller and the two further idler rollers.

7. The conveyor belt according to claim 1, wherein said at least one fixed plate and said at least one mobile plate are dimensioned in such a way that the at least one fixed plate is always at least partially vertically overlapping the at least one mobile plate underneath the mobile belt so as to always ensure continuity of support for the mobile belt in whatever position the mobile frame is located with respect to the support structure.

8. The conveyor belt according to claim 1, comprising adjustment means for adjusting a position of the one of the second rollers placed at the intermediate height (H2) along a movement axis with respect to the mobile frame.

9. The conveyor belt according to claim 1, wherein said mobile frame is slidingly associated to the support structure at two sides of said support structure placed in opposite lateral positions parallel to the movement direction of the transport plane, and wherein the support structure consists of a partially open box-like structure, comprising said two sides which are connected by a bottom wall, which follows an inclination of the inclined section (P3) of the closed path, and a top wall, which is parallel to the transport plane, the support structure also comprising one or more reinforcing longitudinal members, which connect said two sides to each other and act as supports for sliding movement of the mobile frame.

10. A processing line for laminar material, comprising:
    a first processing plant;

a second processing plant, which is placed downstream of said first processing plant and is suitable to process workpieces in output from said first processing plant; and a conveyor belt that is placed between said first processing plant and said second processing plant for transferring workpieces in output from said first processing plant to an input of said second processing plant, wherein said second processing plant is configured to require that in predefined operational phases of processing said input be disengaged by said conveyor belt, wherein said conveyor belt comprises a support structure; a mobile belt which is supported by said support structure and extends between a first end and a second end along a movement direction to form a transport plane; a plurality of rollers that are associated to said support structure and are suitable to support and move said mobile belt along a closed path, said plurality of rollers comprising a drive roller and at least one idler roller, wherein said plurality of rollers comprises two further idler rollers, wherein: two first rollers of said plurality of rollers are placed at a same height (Hi), wherein one first roller is placed at said first end and the other first roller is placed at said second end so as to impose on the mobile belt a horizontal section (P1) in said closed path, the horizontal section (P1) defining said transport plane; and two second rollers of said plurality of rollers are placed in proximity of said second end lower than the two first rollers, said two second rollers being staggered both horizontally and in height respectively at an intermediate height (H2) and at a lower height (H3), so as to impose on the mobile belt—in cooperation with the other first roller arranged at the second end a double S-shaped section (P2) in the closed path, said closed path being completed by an inclined section (P3) connecting the double S-shaped section (P2) to the horizontal section (P1) at the one first roller placed at the first end, wherein the one first roller placed at the first end and the one of the two second rollers placed at said lower height (H3) are rotationally supported directly by said support structure in fixed positions, while the other first roller placed at the second end and the one of the two second rollers placed at said intermediate height (H2) are rotationally supported by a mobile frame which is slidingly associated to said support structure to be moved between a retracted position, in which the other first roller placed at said second end is positioned completely inside said support structure, and an extracted position, in which the other first roller placed at said second end protrudes outside said support structure, wherein, while transitioning between said retracted position and said extracted position, a length of said horizontal section (P1) varies and is compensated by an equivalent variation in length of the double S-shaped section (P2), due to the fact that the one of the two second rollers placed at said intermediate height (H2) integrally follows movements of the other first roller placed at the second end; and—support means suitable for supporting said mobile belt underneath the horizontal section (P1) of said closed path, said support means comprising at least one fixed plate directly associated to said support structure and at least one mobile plate integral with said mobile frame, wherein said at least one fixed plate and said at least one mobile plate are placed on staggered planes underneath and parallel to the transport plane defined by the mobile belt at the horizontal section (P1), and wherein said conveyor belt is placed in a fixed position between said first processing plant and said second processing plant and is oriented in such a way that said mobile belt has its second end placed at the input of said second processing plant when said mobile frame is in said extracted position and in such a way that said mobile belt can disengage said input when said mobile frame is in said retracted position.

11. The processing line of laminar material according to claim 10, wherein said mobile frame is movable between the retracted position and the extracted position by actuator means acting between said support structure and said mobile frame, the processing line further comprising a control unit programmed to control movements of said mobile frame by means of said actuator means according to the operational phases of said second processing plant.

12. The processing line of laminar material according to claim 10, wherein said first processing plant is a laser cutting plant of parts from laminar materials, while said second processing plant is an unloading bench of the parts processed by said first processing plant.

13. The conveyor belt according to claim 4, wherein said actuator means comprise a pair of pneumatic cylinders placed in opposite positions parallel to the movement direction of the transport plane.

14. The conveyor belt according to claim 1, said at least one mobile plate being placed under the at least one fixed plate.

15. The processing line of laminar material according to claim 10, wherein the laminar material is sheet metal.

16. The processing line of laminar material according to claim 10, wherein said first processing plant is a laser cutting plant of parts from laminar materials, while said second processing plant is a roller unloading bench of the parts processed by said first processing plant.

* * * * *